United States Patent

[11] 3,601,025

[72] Inventor Albert Stieringer
Calmbach, Germany
[21] Appl. No. 805,227
[22] Filed Mar. 7, 1969
[45] Patented Aug. 24, 1971
[73] Assignee Robert Bosch Photokino GmbH
Stuttgart Untertuerkheim, Germany
[32] Priority Mar. 27, 1968
[33] Germany
[31] P 12 78 223.9-51

[54] APPARATUS FOR ADJUSTING EXPOSURE CONTROLS OF PHOTOGRAPHIC CAMERAS
9 Claims, 2 Drawing Figs.
[52] U.S. Cl. .................................................. 95/31 FS, 95/10 C, 352/72
[51] Int. Cl. .................................................. G03b 9/18, G03b 19/04
[50] Field of Search .......................................... 352/72; 95/10 C, 31 FS

[56] References Cited
UNITED STATES PATENTS
3,505,937 4/1970 Albedyll et al. ............... 95/10 C
3,495,901 2/1970 Neudecker et al. ............ 352/72
3,461,782 8/1969 Katsuyama ................. 352/72 X
FOREIGN PATENTS
1,278,819 9/1968 Germany ..................... 95/10 C Primary Examiner—Samuel S. Matthews
Assistant Examiner—Russell E. Adams, Jr.
Attorney—Michael S. Striker ABSTRACT: A photographic camera which utilizes magazines provided with markers indicating the sensitivity of film therein. The marker of a magazine which is inserted into the camera is scanned by a scanning member which is coupled to the door-locking device of the camera by a looped snapover spring. When the locking device is moved by hand to an inoperative position in which the user can open the door to gain access to the magazine in a camera housing, the spring biases the scanning member to a predetermined starting position. When the door is closed and the user moves the locking member toward operative position, the spring snaps over and shifts the scanning member into engagement with the marker of the inserted magazine. The spring then biases the scanning member against the marker and simultaneously opposes movement of the locking member from operative position.

Patented Aug. 24, 1971

INVENTOR.
ALBERT STIEFINGER

BY Michael J. Hacker
his ATTORNEY

Patented Aug. 24, 1971

INVENTOR
ALBERT STIEFINGER

BY Michael S. Striker
his ATTORNEY

APPARATUS FOR ADJUSTING EXPOSURE CONTROLS OF PHOTOGRAPHIC CAMERAS

BACKGROUND OF THE INVENTION

The present invention relates to photographic apparatus in general, and more particularly to improvements in adjustable exposure controls for still cameras or motion picture cameras. Still more particularly, the invention relates to improvements in cameras of the type utilizing magazines which are provided with encoded information indicating the sensitivity of film therein.

It is already known to provide a camera with a mechanism which scans the inserted magazine for the position of a marker provided on the magazine to indicate the sensitivity of film. It is also known to provide such cameras with a locking device serving to permit or prevent the opening of a door which affords access to the magazine and to connect the locking device with the scanning mechanism in such a way that the scanning mechanism is caused to engage the marker and to adjust the exposure control as a function of the sensitivity of film in the magazine which is accommodated in the camera in automatic response to movement of the locking device to operative or locking position. The scanning mechanism is disengaged from the marker when the locking device is moved to inoperative position so that the magazine can be withdrawn on opening of the door. The distance covered by the scanning mechanism varies in dependency on the position of the marker, i.e., in dependency on the film speed. The distance which the locking device covers during movement between operative and inoperative positions is always the same. Therefore, the connection between the locking device and the scanning mechanism must be capable of permitting movement of locking device when the scanning mechanism is held against further movement.

Austrian Pat. No. 259,365 discloses a camera wherein a scanning member is biased against the marker by a spring. The locking device comprises a part which engages the scanning member and moves it away from the marker on the inserted magazine when the locking device is moved away from operative position whereby the spring stores energy. A drawback of such proposal is that the movement of locking device toward inoperative position necessitates the exertion of substantial force and that the motion transmitting connection between the locking device and scanning member comprises a number of parts which must be machined with a high degree of precision.

Swiss Pat. No. 425,453 discloses a camera wherein the scanning member is connected with the locking device by a transmission which is capable of transmitting a certain force but permits movement of the locking device independently of the scanning member when the latter engages the marker on a magazine which is accommodated in the camera. The transmission is preferably a friction coupling. The operation of such cameras is quite satisfactory; however, the initial cost of the friction coupling is rather high.

SUMMARY OF THE INVENTION

An object of my invention is to provide a photographic apparatus, particularly a still camera or a motion picture camera, with a simple, compact, inexpensive, rugged and reliable connection between the scanning member and the actuating device which permits or prevents insertion or withdrawal of a magazine from the camera body.

Another object of the invention is to provide a connection which is capable of performing several functions, particularly of biasing the scanning member of the exposure control to starting position or to a position in which the scanning member engages the marker on the inserted magazine.

A further object of the invention is to provide a camera wherein the aforementioned connection comprises a single part.

An additional object of the invention is to provide a connection which can be installed in many types of existing cameras.

Still another object of the invention is to provide a connection which can automatically maintain the actuating device in operative or inoperative position.

The invention is embodied in a photographic apparatus for use with magazines of the type having encoded information to condition the exposure control as a function of film speed. The apparatus comprises scanning means which is movable between a first or starting position and a plurality of second positions each of which is indicative of a different film sensitivity (i.e., in each of which the scanning means engages the marker or a like coding means of a magazine containing a film of predetermined sensitivity), actuating means which preferably includes a locking member for the door which permits or prevents access to the compartment which accommodates the magazine, the actuating means being movable (preferably by hand) between a first end position in which it permits and a second end position in which is prevents access to the magazine, and coupling means for transmitting motion from the actuating means to the scanning means. In accordance with a feature of my invention, the coupling means comprises a preferably looped snapover spring which is arranged to respectively bias the scanning means to first and second positions in the first and second end positions of the actuating means.

According to a more specific feature of the invention, the ends of the snapover spring are connected to posts which are respectively provided on the scanning means and on the actuating means. When the actuating means is moved from first toward second end position, the spring stores energy during a first stage of such movement and thereupon propels the scanning means against the marker of an inserted magazine. The spring then biases the scanning means against the marker and simultaneously opposes movement of the actuating means away from second end position. When the actuating means is moved from second toward first end position, the spring again stores energy during a first stage of such movement and thereupon propels the scanning means to first or starting position while simultaneously opposing movement of the actuating means away from first end position. The scanning means is provided with an adjusting device, for example, with a filter having zones of different light transmissivity, which adjusts the exposure control of the camera as a function of the distance which the scanning means covers during movement from its first position to that second position which is determined by the marker of the inserted magazine.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
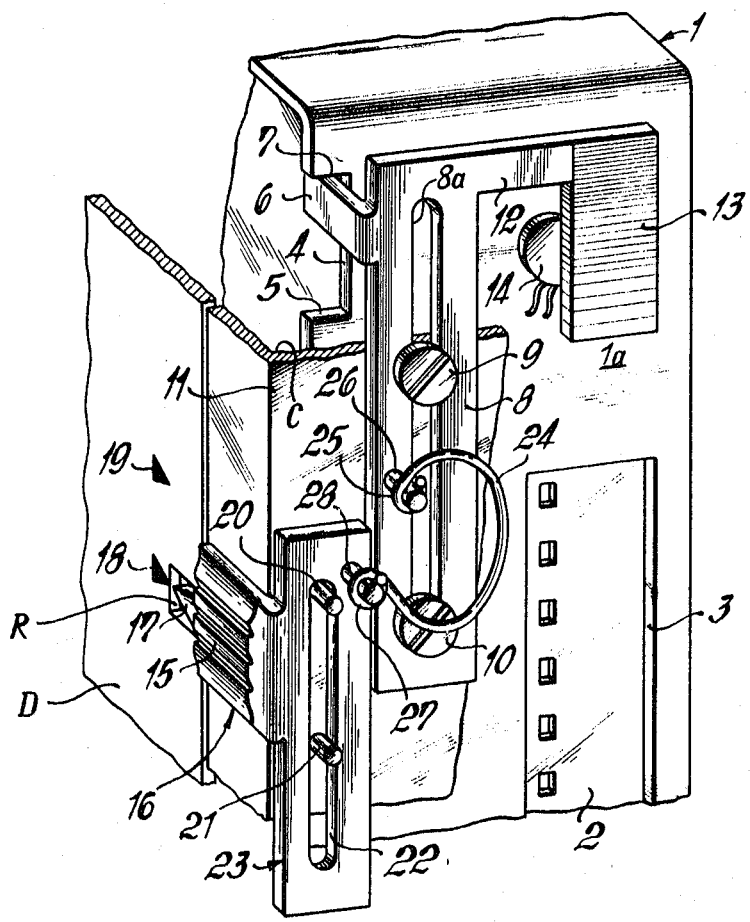
FIG. 1 is a fragmentary perspective view of a motion picture camera which embodies one form of my invention, the scanning means being shown in the first or starting position.

The drawing shows a portion of a motion picture camera which employs magazines or cassettes 1. The magazine shown in FIG. 1 has a window 3 which is provided in its front panel 1a and exposes a length of motion picture film 2. The window 3 is located in the path of light which is admitted by way of the objective, not shown. The film 2 is formed with a single row of perforations which are engaged by a customary claw pull-down, not shown, serving to transport the film stepwise past the film gate.

The front panel 1a of the magazine 1 is formed with a cutout 4 which is provided in its left-hand marginal portion and is flanked by two horizontal surfaces 5, 7. This cutout, and more particularly the lower surface 5 of the cutout, constitutes a marker which is indicative of the sensitivity of film 2. The exposure meter of the camera comprises a scanning device including a scanning member 6 which is adjustable with reference to the camera housing and panel 1a and serves to adjust the exposure meter as a function of sensitivity of the film 2. The distance between the two surfaces 5 and 7 is representative of the sensitivity of film which is accommodated in the magazine. The arrangement is such that the distance between the surfaces 5, 7 is greater if the sensitivity of film is rather low and that such distance is less if the magazine contains film of high sensitivity. When the magazine is properly inserted into the housing of the motion picture camera, the position of the scanning member 6 (which is moved into engagement with the lower surface 5) is indicative of the sensitivity of film in the thus inserted magazine. In FIG. 1, the magazine 1 is assumed to contain motion picture film 2 of lowest sensitivity, i.e., the length of the cutout 4 exceeds the length of cutouts in magazines which contain film of greater sensitivity.

The scanning member 6 forms a bent-over tongue of a platelike carrier 8 which constitutes the main component of the aforementioned scanning device and is adjacent to the front side of the panel 1a. The carrier 8 is formed with an elongated vertical slot 8a for the stems of two threaded guide members 9, 10 secured to a wall 11 of the camera housing. The upper portion of the carrier 8 has a substantially horizontal extension or arm 12 which carries a grey filter 13 movable up and down in front of a photoelectric receiver 14. The receiver 14 forms part of a conventional light meter for adjusting the size of the diaphragm aperture as a function of the intensity of light which can reach its light-sensitive surface. The filter 13 has several zones of different light transmissivity including a lowermost zone of maximum transmissivity and an uppermost zone of minimum transmissivity. If the arm 12 maintains the filter 13 in the uppermost position in which the lowermost zone of the filter is located in front of the receiver 14, the latter receives a relatively large amount of light and causes the diaphragm to define an aperture of small size. The filter 13 assumes such uppermost position if the cutout 4 in a magazine which is inserted into the housing of the camera is short, i.e., if the magazine contains film of high sensitivity. If the cutout 4 is long, the scanning member 6 abuts against a surface 5 which is located at a maximum distance from the surface 7 so that the arm 12 maintains the filter 13 in lowermost position in which a zone of minimum transmissivity admits scene light to the receiver 14. Consequently, the receiver 14 causes the diaphragm to define an aperture of maximum size. Thus, the film 2 receives more scene light if its sensitivity is low.

Figure 2:
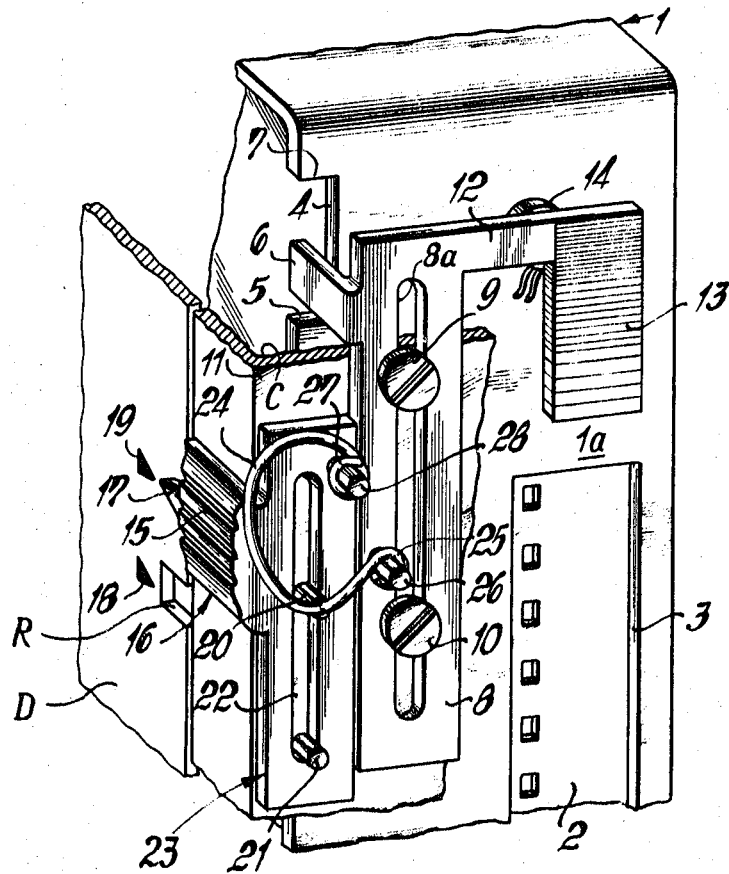
FIG. 2 is a similar fragmentary perspective view of the camera but showing the scanning means in a second position.

The camera further comprises a manually operated actuating or locking member 23 which is a slide formed with a vertical slot 22 for two guide pins 20, 21 provided on the wall 11 of the housing. The slide 23 has an integral pusher or knob 16 which is milled or grooved, as at 15, so that it can be readily displaced by a finger to move its index 17 into registry with one of two graduations 18, 19 provided on a door D, hingedly connected to the camera housing. The door permits or prevents access to a compartment C for the magazine 1. It is held in closed position by the index 17 when the latter registers with the upper graduation 19 as shown in FIG. 2. To open the door, the knob 16 is moved downwardly into the position of FIG. 1 in which the index 17 is in registry with the lower graduation 18 and with a recess R provided in the door D. The distance between the graduations 18, 19 exceeds the maximum length of a cutout 4, i.e., the knob 16 can cover a distance which exceeds the maximum vertical displacement of the scanning member 6.

In accordance with a feature of the present invention, the means for coupling the slide 23 with the carrier 8 for the scanning member 6 and filter 13 comprises a so-called snapover spring 24. This spring serves to move the scanning member 6 from the upper or first position shown in FIG. 1 to one of several second positions. The distance between the two positions of the scanning member 6 depends on the length of the cutout 4 in that magazine 1 which is inserted into the housing of the camera. FIG. 2 shows the scanning member 6 in that second position in which its lower edge face abuts against the lower surface 5 in the cutout 4. When the index 17 is thereupon returned to the position of FIG. 1 (from registry with the graduation 19 into registry with the graduation 18 and the recess R) to effect unlocking of the door D, the snapover spring 24 automatically returns the scanning member 6 to the first position of FIG. 1. The scanning member is then disengaged from the surface 5 and may but need not engage the surface 7. The spring 24 is a loop of elastic wire or band material one end of which is formed with an eye 25 connected to a post 26 on the carrier 8. The other end of the spring 24 forms a second eye 27 which surrounds a post 28 on the slide 23.

When the knob 16 assumes the lower end position of FIG. 1 in which the index 17 permits opening or closing of the door D (in order to permit insertion or removal of a magazine from the compartment C), the spring 24 biases the carrier 8 upwardly and it also biases the slide 23 downwardly. The lower end position of the slide 23 is determined by the guide pin 20 which then abuts against the surface at the upper end of the slot 22. The upper position of the carrier 8 is determined by the stem of the guide member 10 which then abuts against the surface at the lower end of the slot 8a. In such upper end position of the carrier 8, the scanning member 6 assumes a predetermined first position in which it permits unobstructed insertion or withdrawal of a magazine 1 from the compartment C, regardless of the length of the cutout 4 in such magazine. It will be seen that the spring 24 automatically biases the knob 16 to its lower end position in which the index 17 permits opening and closing of the door D.

If the user of the camera thereupon decides to move the knob 16 upwardly to the end position shown in FIG. 2 (in closed position of the door D), the index 17 moves into registry with the upper graduation 19 on the housing of the camera. During such upward movement of the knob 16, the post 28 moves in the same direction while the post 26 on the carrier 8 temporarily remains in the upper position shown in FIG. 1. The spring 24 stores energy and undergoes maximum stressing when the post 28 is raised to the level of the post 26. This is the dead center position of the spring 24. Further upward movement of the post 28 with slide 23 and knob 16 causes the spring 24 to snap over and to propel the post 26 downwardly until the scanning member 6 reaches the lower surface 5 in the cutout 4 of that magazine 1 which is accommodated in the compartment C. This results in automatic adjustment of the filter 13 as a function of sensitivity of film 2 in the inserted magazine. When the spring 24 snaps over, it pushes the knob 16 upwardly so that the index 17 registers with the graduation 19 when the guide pin 21 abuts against the surface in the lower end of the slot 22. The maximum downward displacement of the carrier 8 and scanning member 6 is less than the maximum upward movement of the slide 23, i.e., the scanning member 6 engages the lower surface 5 before the index 17 moves into registry with the upper graduation 19. The spring 24 thereupon maintains the scanning member 6 in abutment with the surface 5 and simultaneously biases the slide 23 against the lower pin 21 so that the scanning member and the knob 16 remain in the positions shown in FIG. 2 until the user decides to return the knob 16 to the end position of FIG. 1 in order to gain access to the magazine in the compartment C. When the knob 16 moves downwardly from the position of FIG. 2 toward the position of FIG. 1, the post 28 travels downwardly and stresses the spring 24. The spring snaps over when the post 28 moves to the approximate level of post 26; this causes the carrier 8 to move upwardly and to disengage the scanning member 6 from the surface 5. The carrier 8 is arrested when the stem of the guide member 10 engages the surface at the lower end of the slot 8a. The spring 24 also propels the slide 23 and knob 16 downwardly; the slide comes to a halt when the knob 16 registers with the graduation 18, i.e., when the pin 20 abuts against the surface at the upper end of the slot 22. The door D is then unlocked and the user can open the door so that the magazine 1 can be removed from the compartment C. When the carrier 8 assumes its upper position (in which the index 17 registers with graduation 18), the arm 12 maintains the filter 13 in the upper end position in which the photoelectric receiver 14 is located behind the zone of maximum light transmissivity.

If desired, the knob 16 can constitute a separate part of the camera. Such separate knob is then connected with the slide 23 by way of a suitable transmission, e.g., by a gear train or the like. It is equally within the purview of the invention to couple the post 28 with the door D in such a way that the post 28 performs movements similar to those described in connection with FIGS. 1 and 2 when the door is opened and closed.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a photographic apparatus for use with film magazines of the type having encoded information to condition the exposure control as a function of the sensitivity of film, a combination comprising scanning means movable between a first position and a plurality of second positions each of which is indicative of a different film sensitivity; actuating means movable by hand between a first end position and a second end position; and coupling means for transmitting motion from said actuating means to said scanning means, said coupling means comprising a snapover spring arranged respectively to bias said scanning means to first and second positions in the first and second end positions of said actuating means and to oppose the movement of said actuating means from both end positions thereof.

2. A combination as defined in claim 1, wherein said spring comprises a loop having a first end connected with said scanning means and a second end connected with said actuating means.

3. A combination as defined in claim 1, further comprising a housing having guide means for confining said actuating means to reciprocatory movement between said end positions thereof.

4. A combinations as defined in claim 1, further comprising a housing having guide means for confining said scanning means to reciprocatory movement between said first position and said second positions thereof.

5. A combination as defined in claim 1, wherein said actuating means comprises a locking member and a knob connected with said locking member, and further comprising a door movable between open and closed positions, said locking member being arranged to respectively permit and prevent opening of said door in closed position of the door when said actuating means respectively assumes said first and second end positions.

6. A combination as defined in claim 1, wherein said scanning means comprises a reciprocable carrier and a tongue on said carrier, said tongue extending into a notch provided in a magazine which is inserted into the camera.

7. A combination as defined in claim 1, wherein the distance between the first and second end positions of said actuating means exceeds the maximum distance between the first position and a second position of said scanning means.

8. A combination as defined in claim 1, wherein said scanning means includes a filter having zones of different light transmissivity and further comprising a photosensitive receiver located behind said filter, said scanning means being arranged to maintain in the first position thereof said filter in a position in which the zone of maximum light transmissivity is located in front of said receiver.

9. A combination as defined in claim 1, further comprising means for arresting said actuating means in each of said end positions.